United States Patent [19]
Ludwig et al.

[11] 3,966,842
[45] June 29, 1976

[54] THERMOPLASTIC MOLDING COMPOSITIONS OF RUBBER-REINFORCED STYRENE/MALEIC ANHYDRIDE RESINS AND POLYCARBONATE RESINS

[75] Inventors: Peter J. Ludwig, Huntington Beach, Calif.; Arnett L. Bird, Midland, Mich.

[73] Assignee: The Dow Chemical Company, Midland, Mich.

[22] Filed: July 18, 1974

[21] Appl. No.: 489,675

[52] U.S. Cl. .............................. 260/873; 264/211; 264/328
[51] Int. Cl.² ........................................ C08L 67/06
[58] Field of Search ................... 260/873, 880, 802; 264/328

[56] References Cited
UNITED STATES PATENTS

| | | | |
|---|---|---|---|
| 2,858,281 | 10/1958 | Bauman et al. | 260/879 |
| 3,130,177 | 4/1964 | Grabowski | 260/873 |
| 3,655,824 | 4/1972 | Kato et al. | 260/873 |
| 3,862,998 | 1/1975 | Koehler et al. | 260/873 |

*Primary Examiner*—Murray Tillman
*Assistant Examiner*—J. Ziegler
*Attorney, Agent, or Firm*—Robert B. Ingraham

[57] ABSTRACT

Thermoplastic compositions with improved physical properties are obtained by blending from 12 to 40 weight percent of a polycarbonate resin with from about 88 to 60 weight percent of a rubber-reinforced styrene/maleic anhydride copolymer.

8 Claims, No Drawings

THERMOPLASTIC MOLDING COMPOSITIONS OF RUBBER-REINFORCED STYRENE/MALEIC ANHYDRIDE RESINS AND POLYCARBONATE RESINS

The present invention is concerned with thermoplastic molding compositions which are blends of polycarbonate resin and rubber-reinforced alkenyl aromatic-dicarboxylic anhydride resins such as rubber-reinforced styrene/maleic anhydride resins. The polycarbonate resins possess particularly desirable physical properties and are molded into a wide variety of durable articles. Rubber-reinforced styrene/maleic anhydride resinous compositions are known which are also particularly suitable for molding into a variety of configurations. However, such styrene/maleic anhydride rubber compositions are generally substantially lower in cost than are the polycarbonate resins. It is known to blend polycarbonate resins with acrylonitrile/butadiene/stryene resins. Such practice is set forth in U.S. Pat. 3,663,471.

It would be desirable if there were available a means for increasing the physical properties of rubber-reinforced styrene/maleic anhydride resins.

It would also be desirable if there were available an improved rubber-reinforced styrene/maleic anhydride composition having improved physical properties.

It would further be desirable if there were available an improved method for increasing the physical properties of rubber-modified styrene/maleic anhydride resins.

These benefits and other advantages in accordance with the present invention are achieved in a thermoplastic composition, the thermoplastic molding composition comprising an admixture of (a) a rubber-reinforced styrene/maleic anhydride composition, the rubber-reinforced styrene/maleic anhydride composition having copolymerized therein from 65 to 85 parts by weight of styrene and from 10 to 35 parts by weight of maleic anhydride and from 5 to 40 parts by weight of a rubber, and (b) a polycarbonate resin in a proportion of from about 12 to 40 parts by weight of the polycarbonate resin to 88 to 60 parts by weight of the rubber-reinforced styrene/maleic anhydride resin.

Also contemplated within the scope of the present invention is a method for the preparation of molded resinous parts, the method comprising providing a mixture of a styrene-containg resin and a polycarbonate resin, heating the mixture of the resin to a temperature sufficient to heat plastify the resin, mechanically admixing the styrene-containing resin and polycarbonate resin, expressing the heat plastified resinous mixture into a mold cavity and cooling the mixture below its thermoplastic temperature, the improvement which comprises employing as the resin mixture (a) a rubber-reinforced styrene/maleic anhydride composition, the rubber-reinforced styrene/maleic anhydride composition having copolymerized therein from 65 to 85 parts by weight of styrene and from 10 to 35 parts by weight of maleic anhydride and from 5 to 40 parts by weight of a rubber, and (b) a polycarbonate resin in a proportion of from about 12 to 40 parts by weight of the polycarbonate resin to 88 to 60 parts by weight of the rubber-reinforced styrene/maleic anhydride resin.

Suitable styrene/maleic anhydride rubber-reinforced polymers are (a) a monovinyl alkenyl aromatic monomer containing up to 12 carbon atoms and having the alkenyl group attached directly to the benzene nucleus, the alkenyl aromatic compound being present in a proportion of from about 65 to 85 parts by weight and from 35 to 10 parts by weight of an unsaturated dicarboxylic anhydride readily copolymerizable therewith, and (b) from 5 to 40 parts by weight (and beneficially from 10 to 25 parts by weight) of a rubber per 100 parts of (a) plus (b), the rubber being in the form of a plurality of particles having diameters within the range of 0.02 to 30 microns (and beneficially from 0.1 to 10 microns) dispersed throughout a continuous phase of a polymer of alkenyl aromatic monomer and the anhydride, at least a major portion of the rubber particles containing occlusions of the polymerization of (a).

Impact resistant polymer of an alkenyl aromatic monomer and an unsaturated dicarboxylic anhydride copolymerizable therewith, the polymer being suitable for the practice of the present invention are prepared by providing an alkenyl aromatic monomer having dissolved therein a rubber, agitating the monomer/rubber mixture and initiating free radical polymerization thereof, adding to the agitated mixture the unsaturated dicarboxylic anhydride at a rate substantially less than the rate of the polymerization of the alkenyl aromatic resinous monomer, and polymerizing the alkenyl aromatic monomer and the unsaturated anhydride, the alkenyl aromatic monomer being employed in a proportion of from about 65 to 85 parts by weight, the unsaturated anhydride from about 35 to 10 parts by weight, and the rubber in a proportion of from about 5 to 40 parts per 100 parts, based on the combined weight of the alkenyl aromatic monomer, the anhydride and the rubber.

By the term "alkenyl aromatic monomer" is meant an alkenyl aromatic compound having the general formula wherein Ar represents an aromatic hydrocarbon radical, or an aromatic halohydrocarbon radical of the benzene series, and R is hydrogen or the methyl radical and containing up to 12 carbon atoms. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene and the like. Such polymerizations may be catalyzed or uncatalyzed and conducted under conventional temperatures and conditions and are readily controlled as to the particle size of the rubber in accordance with the present invention. Comonomers polymerizable with the alkenyl aromatic monomer and anhydride are methylmethacrylate, methylacrylate, ethylmethacrylate, ethylacrylate, acrylonitrile, methacrylonitrile and the like. Beneficially, such monomers are employed in a proportion of from about 10 to 40 weight percent of the anhydride/butadiene/styrene polymer composition, and advantageously from about 20 to 35 weight percent of the polymer composition.

Suitable rubbers for the preparation of the rubber-reinforced polymers are diene rubbers or mixtures of diene rubbers; i.e., any rubbery polymers (a polymer having a glass temperature not higher than 0°C., and preferably not higher than −20°C., as determined by ASTM Test D-746-52T) of one or more conjugated 1,3 dienes; e.g., butadiene, isoprene, piperylene, chloroprene, etc. Such rubbers include homopolymers, interpolymers and block copolymers of conjugated 1,3 dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the ar-ethylstyrenes, p-tertbutylstyrene, etc; an α-alkylstyrene, such as α-methylstyrene, α-ethylstyrene, α-methyl-p-methylstyrene, etc; vinyl naphthalene, etc.); ar-halo monovinylidene aromatic hydrocarbons (e.g., the o-, m- and p-chlorostyrenes, 2,4-di-bromostyrene, 2-methyl-4-chlorostyrene, etc.); acrylonitrile; methacrylonitrile, alkyl acrylates (e.g., methylacrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); α-olefins (e.g., ethylene, propylene,, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction, particularly for a mass or bulk polymerization reaction. In addition, excessive cross-linking can result in loss of the rubbery characteristics. The cross-linking agent can be any of the agents conventionally employed for cross-linking diene rubbers; e.g., divinylbenzene, diallyl maleate, diallyl fumarate, diallyl adipate, allyl acrylate, allyl methacrylate, diacrylates and dimethacrylates of polyhydric alcohols; e.g., ethylene glycol dimethacrylate, etc.

A preferred group of rubbers are those consisting essentially of 65 to 100 percent by weight of butadiene and/or isoprene and up to 35 percent by weight of a monomer selected from the group consisting of alkenyl aromatic hydrocarbons (e.g., styrene) and unsaturated nitriles (e.g., acrylonitrile), or mixtures thereof. Particularly advantageous substrates are butadiene homopolymer or an interpolymer of A-B block copolymers of from 70 to 95 percent by weight butadiene and from 5 to 30 percent by weight of styrene.

The rubbers or rubbery reinforcing agents employed in the present invention must also meet the following requirements: an inherent viscosity from about 0.9 to 2.5 and preferably 0.9 to 1.7 grams per deciliter (as determined at 25°C. employing 0.3 grams of rubber per deciliter of toluene). Advantageously, the amount of such rubbery reinforcing agent can be from 5 to 35 weight percent of the final product, and beneficially from 10 to 25 percent, and most advantageously from 15 to 25 percent. If desired, a molecular weight regulator or chain transfer agent may be added after phase inversion in relatively small amounts, such as from about 0.001 to 1 percent by weight of the polymerizable monomers. Such chain transfer agents can conveniently be organic thiols such as butyl mercaptans, tertiary dodecyl mercaptans, lauryl mercaptans, stearyl mercaptans, benzoyl mercaptans, cyclohexylmercaptan; dithiols such as 1,6-hexanedithiol; halogenated hydrocarbons such as carbon tetrachloride, carbon tetrabromide; phosphines such as phenyl phosphine, ethyl phosphine, butyl phosphine, octyl phosphine; primary and secondary alkyl amines; primary and secondary aromatic amines, α-methylstyrene dimer; ferric chloride; carboxylic acid esters such as ethyl acetate, butyl stearate, ethyl benzoate, benzyl acetate, ethyl butyrate, and the like. Incorporation of the molecular weight regulator prior to phase inversion results in some physical properties in the polymer which are less desirable.

Preparation of the rubber-reinforced alkenyl aromatic-unsaturated anhydride polymers is readily accomplished by the initiation of polymerization of the alkenyl aromatic monomer solution of the rubber by thermal or beneficially, free radical initiators. Once polymerization has been initiated, the unsaturated copolymerizable anhydride is then added to the polymerizing mixture in a continuous or continual manner to maintain the concentration of the unsaturated anhydride at a relatively low level. Such processes for the copolymerization of styrene and maleic anhydride have been described at length in the literature, especially in U.S. Pat. Nos. 2,971,939 and 2,769,804, and beneficially as a solution as disclosed in U.S. Pat. No. 3,336,267. The teachings of these patents are herewith incorporated by reference thereto.

The copolymers useful in the present invention are non-equimolar random copolymers of the alkenyl aromatic monomer with a copolymerizable anhydride and are prepared typically employing the methods of the hereinbefore mentioned patents. For example, a polymer prepared from 75 mole percent styrene and 25 mole percent maleic anhydride by admixing the monomers with suitable diluent and catalyst, heating until polymerization is about complete will yield a polymer or polymer mixture which is not suitable for the practice of the present invention.

Polymerization of the polymerizable mixture may be accomplished by thermal polymerization generally between temperatures of 60°C. to 170°C. and preferably from 70°C. to 140°C., or alternately any free radical generating catalyst may be used in the practice of the invention, including actinic radiation. It is preferable to incorporate a suitable catalyst system for polymerizing the monomer, such as the conventional monomer-soluble peroxy and perazo compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di (tert-butylperoxy)-hexane, 2,5-dimethyl-2,5-di(tert-butylperoxy)hexyne-3, tertbutyl hydroperoxide, cumene hydroperoxide, p-methane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, 2,2'-azobisisobutyronitrile, etc., and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

Suitable polycarbonate resins which may be employed for the practice of the present invention include all extrudable and injection moldable polycarbonate resins. Such polycarbonates are well known in the art and are commercially available. A variety of such polycarbonates or polycarbonate blends are disclosed in the following U.S. Letters Pat. Nos. 3,649,712, 3,239,582, 3,742,088, 3,036,036 and 3,028,365; the teachings of which are herewith incorporated by reference.

Polymer blends in accordance with the present invention are readily prepared by conventional techniques such as admixing of granular or particulate resins and subsequent malaxation of the resins at a temperature sufficiently high to cause heat plastification thereof. Alternately, the blends may be prepared by heat plastifying one of the resins and adding the other resin thereto either in granular or heat plastified form. One particularly convenient manner of preparing the resin blends in accordance with the present invention is to dry blend the particulate resins and directly feed them to a mixing and heat fabricating apparatus such as a screw extruder or a reciprocating screw injection molding machine. The manner of mixing the resins in heat plastified form is not critical but sufficient working should be obtained that when resins of different color are utilized, the resultant mixture should appear to have a homogeneous color when viewed with the unaided eye. The polymers useful for the practice of the invention may also be blended by mixing solutions thereof and subsequently removing the solvent.

The following examples serve to illustrate the invention but are not to be considered limiting. A rubber-modified styrene/maleic anhydride polymer is employed in Examples 1–7 which has the hereinbefore delineated characteristics. The polymer contains 18.1 weight percent rubber, 16.7 weight percent maleic anhydride and 65.2 weight per cent styrene, the rubber has a particle size of about one micron. Added to the polymer is 1.5 parts per 100 parts of polymer of a commercially available heat stabilizer.

EXAMPLE 1

Nine parts by weight of rubber-modified styrene/maleic anhydride resin in particulate form are mixed with one part by weight of a commercially available polycarbonate resin: poly 14, 4'-isopropylidene-bisphenol carbonate sold under the trade designation of "Lexan 141" manufactured by General Electric Corp.

The particulate resins are tumble blended until an apparently uniform mixture is obtained. The blended resin is then injection molded using a reciprocating screw molding machine to form a plurality of test bars of the configuration required by American Society of Testing Materials test D-638 type 1. The following conditions are employed for injection molding: shot weight 22.6 grams; rear zone temperature 470°F.; front zone temperature 515°F.; nozzle temperature 490°F.; mold temperature 190°F.; injection time 10 seconds; cooling time 25 seconds; mold open time 4 seconds; injection pressure 6000 pounds per square inch; back pressure on the reciprocating screw 350 pounds per square inch. After molding the injection molded specimens are conditioned for 48 hours at 73°F. and 53 percent relative humidity and then are evaluated for impact strength employing ASTM test D-256 for notched Izod impact. The average of 6 specimens shows an impact strength of 2.9 foot pounds per inch of notch.

EXAMPLE 2

The procedure of Example 1 is repeated with the following exceptions: 8.5 parts by weight rubbermodified styrene/maleic anhydride polymer is employed and 1.5 parts by weight of the polycarbonate resin of Example 1 are used. The shot weight employed is 23.9 grams; rear zone temperature 480°F.; front zone temperature 520°F.; nozzle temperature 480°F.; mold temperature 190°F.; injection time 9 seconds; cooling time 26 seconds; injection pressure 7100 pounds per square inch. The impact strength is 7.3 foot pounds per inch of notch.

EXAMPLE 3

The procedure of Example 1 is repeated with the following exceptions: 8 parts by weight of rubbermodified styrene/maleic anhydride resin are employed with 2 parts by weight of the polycarbonate resin. The shot weight is 23.3 grams; rear zone temperature 480°F.; front zone temperature 520°F.; nozzle temperature 485°F.; injection time 9 seconds; cooling time 24 seconds; injection pressure 7000 pounds per square inch; the Izod impact strength is 8.5 foot pounds per inch of notch.

EXAMPLE 4

The procedure of Example 1 is repeated with the exception that 75 parts by weight of rubber-modified styrene-maleic anhydride resin are employed with 2.5 parts by weight of polycarbonate resin. The shot weight is 23.3. grams; rear zone temperature 480°F.; front temperature 520°F.; injection time 9 seconds; cooling time 24 seconds; injection pressure 7100 pounds per square inch. The impact strength of the molded bars is 10.3 foot pounds per inch of notch.

EXAMPLE 5

The procedure of Example 1 is repeated with the following exceptions: 7 parts by weight of rubbermodified styrene/maleic anhydride resin are employed with 3 parts by weight polycarbonate resin. The shot weight is 23.3 grams; rear zone temperature 480°F.; front zone temperature 520°F.; injection time 9 seconds; cooling time 24 seconds; injection pressure 6700 pounds per square inch. The impact strength of the molded bars is 12.8 foot pound per inch of notch.

EXAMPLE 6

The procedure of Example 1 is repeated with the following exceptions: 6 parts by weight of rubber-modified styrene/maleic anhydride are employed with 4 parts by weight polycarbonate resin. Shot weight is 23.5 grams; rear zone temperature 485°F.; front zone temperature 520°F.; nozzle temperature 495°F.; cooling time is 20 seconds; injection pressure 6700 pounds per square inch. The molded bars have an impact strength of 7.9 foot pounds inch of notch.

EXAMPLE 7

The procedure of Example 1 is repeated with the following exceptions: equal parts of polycarbonate and styrene/maleic anhydride resin are employed. Shot weight is 23.6 grams; rear zone temperature 485°F.; front zone temperature 520°F.; cooling time 20 seconds; injection pressure 6800 pounds per square inch; back pressure on the screw 380 pounds per square inch; the molded bars have an impact strength of 9.8 foot pounds per inch of notch.

EXAMPLE 8

Thirty parts by weight of the polycarbonate resin of Example 1 and 70 parts by weight of a rubber-modified styrene/maleic anhydride resin containing 17.6 weight percent rubber; 64.7 weight percent styrene and 17.7 weight percent maleic anhydride together with 1.5 parts of a heat stabilizer per 100 parts of the rubber-modified maleic anhydride resin are tumble blended and the blend fed into a one inch extruder having a length to diameter ratio of 24:1. The screw has 3:1 compression ratio. The heat plastified resin is passed through a screen pack prior to entering a strand die from which it is extruded. The extruder conditions are as follows: first heating zone temperature 470°F.; second heating zone temperature 490°F.; die temperature 470°F.; the pressure at the die is 750 pounds per square inch; screw speed is 120 revolutions per minute. The feed zone of the extruder is cooled by a water jacket. The resulting strand is cooled and cut into more or less cylindrical granules. The granules are then injection molded in a reciprocating screw molding machine to form plaques 44 × 8 × ⅛ inch. The injection molding machine conditions are as follows: first zone temperature 430°F.; second zone temperature 430°F.; third zone temperature 380°F.; nozzle temperature 410°F.; mold temperature 100°F.; injection pressure 18,000 pounds per square inch. The samples are conditioned in the manner set forth in Example 1 and evaluated for impact strength in a similar manner. The impact strength is 12.5 foot pounds per inch of notch.

EXAMPLE 9

For purposes of comparison a blend is prepared of 25 parts by weight of polycarbonate resin and 75 parts by weight of a styrene/maleic anhydride copolymer containing 74.6 percent styrene and 25.4 percent maleic anhydride. A dry blend is molded in the reciprocating screw injection molding machine wherein the rear zone temperature is 490°F.; front zone temperature 520°F.; nozzle temperature 485°F.; mold temperature 190°F.; injection pressure is 6800 pounds per square inch; back pressure 500 pounds per square inch; injection time 10 seconds; cooling time 28 seconds; mold open time 4 seconds. The moldings were subsequently evaluated for impact strength in the manner of Example 1. After conditioning the impact strength is 0.24 foot pound per inch of notch.

EXAMPLE 10

A dry blend is prepared of 3 parts by weight of polycarbonate resin commercially available under the trade designation of Lexan 141 manufactured by General Electric Corp. and 7 parts by weight of rubber-modified styrene/maleic anhydride resin containing 24 parts by weight rubber; 13.7 parts by weight maleic anhydride and 62.2 parts by weight styrene. The dry blend is injection molded into test bars of the variety employed in Example 1 using a reciprocating screw injection molding machine under the following conditions: shot weight 23.6 grams; rear zone temperature 485°F.; front zone temperature 520°F.; nozzle temperature 485°F.; mold temperature 190°F.; injection pressure 7400 pounds per square inch; back pressure 300 pounds per square inch; injection time 9 seconds; cooling time 26 seconds; mold open time 2 seconds. The resultant test bars are conditioned and tested for impact resistance in the manner of Example 1. The impact strength is 11.3 foot pounds per inch of notch.

EXAMPLE 11

The procedure of Example 1 is repeated with the following exceptions: 4 parts by weight of the resin are employed with 6 parts by weight of a rubber-modified styrene/maleic anhydride resin containing 5.6 percent rubber; 19.8 percent maleic anhydride and 74.6 percent styrene. Shot weight is 24.5 grams; rear zone temperature 485°F.; front zone temperature 520°F.; nozzle temperature 480°F.; injection time 9 seconds; cooling time 28 seconds; mold open time 2 seconds; injection pressure 6500 pounds per square inch; back pressure 300 pound per square inch; the impact strength is 7.2 foot pounds per inch of notch.

EXAMPLE 12

The procedure of Example 1 is repeated with the following exceptions: the dry blend consists of 25 parts by weight polycarbonate resin; 75 parts by weight of a rubber-modified styrene/maleic anhydride copolymer containing 19.6 weight percent rubber; 18.8 weight percent maleic anhydride and 61.6 weight percent styrene. The rear zone temperature is 510°F.; front zone temperature 530°F.; nozzle temperature 510°F.; injection pressure 8000 pounds per square inch. The test bars have an impact strength of 10.3 foot pounds per inch of notch.

EXAMPLE 13

A dry blend is prepared employing 30 parts by weight of an epichlorohydrin/bisphenol A polycarbonate copolymer having 12 mole percent ephiclorohydrin added and 70 parts by weight of a rubber-modified styrene/maleic anhydride resin which contains 17.6 weight percent rubber, 64.7 weight percent styrene and 17.7 weight percent maleic anhydride. The rubber-modified styrene/maleic anhydride resin contains 1.5 parts by weight per 100 parts by weight of the resin of a commercially available heat stabilizer. The two resins are tumbled until uniform admixture is obtained. The blend is subsequently fed to a one inch extruder having a 3:1 compression screw and through a screen pack into a strand die. As the strands of the blend are extruded they are chopped into granules. The extruder conditions are: first zone temperature 470°F.; second zone temperature 490°F.; die temperature 470°F.; die pressure 700 pounds per square inch; screw speed 120 revolutions per minute. The feed zone of the extruder is cooled by a water jacket. The granules obtained from extrusion are injection molded on a 1½ ounce shot capacity reciprocating screw injection molding machine into test bars of the configuration employed in Example 1 and into 2 inch diameter discs. Molding conditions are as follows: rear zone temperature 380°F.; center zone 410°F.; nozzle temperature 390°F.; mold temperature 100°F.; injection pressure 11,000 pounds per square inch employing a screw speed of 70 revolutions per minute. The test bars are conditioned and evaluated as in Example 1 and have an impact strength of 7.1 foot pounds per inch of notch.

In a manner similar to the foregoing examples, other polycarbonate alkenyl aromatic-dicarboxylic anhydride rubber blends are readily prepared with commensurate results employing the proportions and compositions hereinbefore set forth.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A thermoplastic molding composition comprising an intimate admixture of
   a. a diene rubber-containing styrene/maleic anhydride composition, the rubber-containing styrene/maleic anhydride composition having copolymerized therein from 65 to 85 parts by weight of styrene and from 10 to 35 parts by weight of maleic anhydride and from 5 to 40 parts by weight of a rubber, the diene rubber being in the form of particles having diameters within the range of 0.02 to 30 microns dispersed throughout a continuous phase of styrene maleic anhydride resin, and
   b. a polycarbonate resin in a proportion of from about 12 to 40 parts by weight of the polycarbonate resin to 88 to 60 parts by weight of the diene rubber-containing styrene/maleic anhydride resin.

2. The composition of Claim 1 wherein the rubber is present in (a) in a proportion of from about 10:25 parts by weight.

3. The composition of claim 1 wherein the rubber has particles having diameters in the range of 0.01 to 10 microns.

4. The composition of claim 1 wherein the particles of rubber exhibit occlusions of the styrene/maleic anhydride polymer.

5. A method for the preparation of molded resinous parts, the method comprising providing a mixture of (1), a styrene-containing resin and (2) a polycarbonate resin, the resin mixture comprising (a) a diene rubber-containing styrene/maleic anhydride composition, the diene rubber-containing styrene/maleic anhydride composition having copolymerized therein from 65 to 85 parts by weight of styrene and from 10 to 35 parts by weight of maleic anhydride and from 5 to 40 parts by weight of a rubber, the rubber being in the form of particles having diameters within the range of 0.02 to 30 microns dispersed throughout a continuous phase of styrene maleic anhydride resin and (b) a polycarbonate resin in a proportion of from about 12 to 40 parts by weight of the polycarbonate resin to 88 to 60 parts by weight of the rubber-containing styrene/maleic anhydride resin, heating the mixture of resin to a temperature sufficient to heat plastify the resin, admixing the styrene-containing resin and polycarbonate resin, expressing the heat plastified resinous mixture into a mold cavity and cooling the mixture below its thermoplastic temperature.

6. The composition of Claim 5 wherein the rubber is present in (a) in a proportion of from about 10:25 parts by weight.

7. 5. The composition of Claim 5 wherein the diene rubber in (a) is in the form of particles having diameters of 0.01 to 10 microns.

8. The composition of claim 5 wherein the particles of rubber exhibit occlusions of the styrene/maleic anhydride polymer.

* * * * *

UNITED STATES PATENT AND TRADEMARK OFFICE
CERTIFICATE OF CORRECTION

PATENT NO. : 3,966,842
DATED : June 29, 1976
INVENTOR(S) : Peter J. Ludwig and Arnett L. Bird Page 1 of 2

It is certified that error appears in the above-identified patent and that said Letters Patent are hereby corrected as shown below:

Column 1, line 20, delete "stryene" and insert --styrene--.

Column 2, line 35, after the word "formula", insert

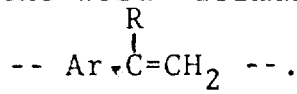

Column 3, line 3, delete "p-tertbutylstyrene" and insert --p-tert-butylstyrene--.

Column 4, line 46, delete "tertbutyl" and insert --tert--butyl--.

Column 5, line 61, delete "rubbermodified" and insert --rubber-modified--.

Column 6, line 6, delete "rubbermodified" and insert --rubber-modified--.

Column 6, line 29, delete "rubbermodified" and insert --rubber-modified--.

Column 6, line 47, after the word "pounds", insert --per--.

Column 8, line 4, delete "pound" and insert --pounds--.

UNITED STATES PATENT AND TRADEMARK OFFICE
CERTIFICATE OF CORRECTION

PATENT NO. : 3,966,842

DATED : June 29, 1976

INVENTOR(S) : Peter J. Ludwig and Arnett L. Bird

It is certified that error appears in the above-identified patent and that said Letters Patent are hereby corrected as shown below:

Column 9, line 28, delete ",".

Column 10, line 23, delete "7.5" and insert --7.--.

Signed and Sealed this

Eighth Day of March 1977

[SEAL]

Attest:

RUTH C. MASON
Attesting Officer

C. MARSHALL DANN
Commissioner of Patents and Trademarks